(12) United States Patent
Kuo et al.

(10) Patent No.: US 11,500,155 B1
(45) Date of Patent: Nov. 15, 2022

(54) OPTICAL COUPLER, GRATING STRUCTURE AND FORMING METHOD THEREOF

(71) Applicant: Taiwan Semiconductor Manufacturing Company, Ltd., Hsinchu (TW)

(72) Inventors: Feng-Wei Kuo, Hsinchu County (TW); Wen-Shiang Liao, Miaoli County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/383,451

(22) Filed: Jul. 23, 2021

(51) Int. Cl.
G02B 6/13 (2006.01)
G02B 6/12 (2006.01)
G02B 6/124 (2006.01)

(52) U.S. Cl.
CPC ............... *G02B 6/124* (2013.01); *G02B 6/13* (2013.01); *G02B 2006/12061* (2013.01); *G02B 2006/12104* (2013.01); *G02B 2006/12107* (2013.01); *G02B 2006/12147* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,815,615 | A * | 9/1998 | Taneya | H01S 5/026 385/50 |
| 2011/0150392 | A1* | 6/2011 | Qian | G02B 6/124 385/37 |
| 2011/0286700 | A1* | 11/2011 | Feng | G02B 6/12007 385/37 |
| 2012/0128019 | A1* | 5/2012 | Chang-Hasnain | H01S 5/423 372/45.01 |

* cited by examiner

*Primary Examiner* — Charlie Y Peng
(74) *Attorney, Agent, or Firm* — JCIPRNET

(57) ABSTRACT

An optical coupler includes a substrate, a mirror layer, a plurality of coupling gratings, a plurality of waveguides, and an oxide layer. The substrate includes a first surface, a second surface opposite to the first surface, and a concave portion exposed from the first surface. The mirror layer is disposed in the concave portion. The coupling gratings are disposed above the mirror layer. The waveguides are laterally aligned with the coupling gratings. The concave portion faces both the coupling gratings and the waveguides. The oxide layer is bonded on the first surface. The coupling gratings and the waveguides are disposed on the oxide layer.

20 Claims, 15 Drawing Sheets

OPTICAL COUPLER, GRATING STRUCTURE AND FORMING METHOD THEREOF

BACKGROUND

Optical gratings are used to enable communication between light sources and other components such as photodetectors. For example, optical gratings can be used to redirect light from an optical fiber into an optical director. Light can be coupled from an end of the optical gratings and travel transversely through the optical gratings by reflecting to allow the redirected light to be transmitted from the other end of the optical gratings. After light transmitted from the optical gratings, the light could impinge upon a director. The detected light might be used for purposes such as to receive an encoded communications signal that was transmitted through the optical gratings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
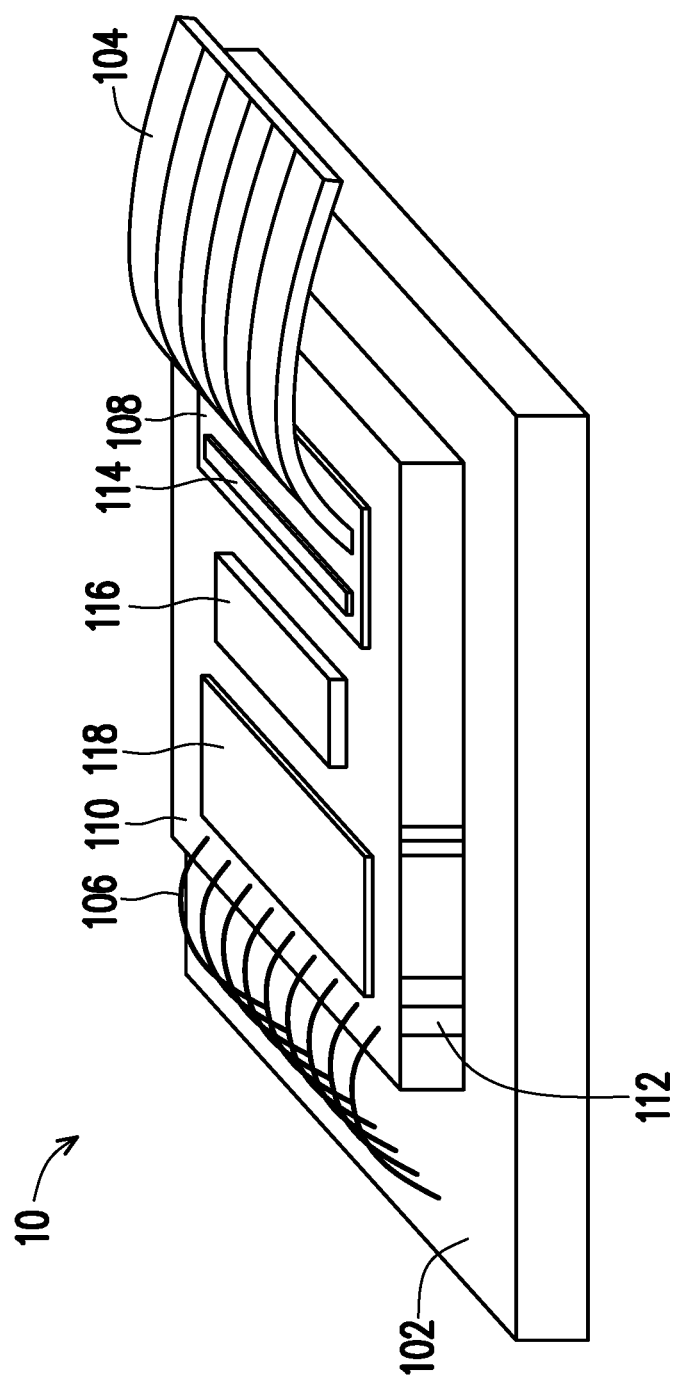
FIG. 1 is a schematic view illustrating an optical coupling device in accordance with some embodiments of the disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In addition, terms, such as "first," "second," "third," "fourth," and the like, may be used herein for ease of description to describe similar or different element(s) or feature(s) as illustrated in the figures, and may be used interchangeably depending on the order of the presence or the contexts of the description.

FIG. 1 is a schematic view illustrating an optical coupling device 10 in accordance with some embodiments of the disclosure. In some embodiments, the optical coupling device 10 includes an electronic die 118, a light source die 116, a photonic die 108, an interposer 110, and a printed circuit board (PCB) substrate 102. The electronic die 118, the light source die 116, and the photonic die 108 are coupled together through input/output interfaces (not shown) on the interposer 110. In some embodiments, the interposer 110 is fabricated using, for example, silicon material. In some embodiments, the interposer 110 can include an interconnecting routing, through silicon vias (TSVs), and contact pads. In some embodiments, the interposer 110 can be utilized to integrate all components including the electronic die 118, the light source die 116, and the photonic die 108 together. In some embodiments, each of the dies 108, 116, and 118 can be coupled to the PCB substrate 102 through wire bonding 106 or through silicon-vias (TSVs) 112 using soldering balls. The TSVs 112 can include electrically conductive paths that extend vertically through the interposer 110 and provide electrical connectivity between the electrical die 118 and the PCB substrate 102. In certain embodiments, the PCB substrate 102 can include a support structure for the optical coupling device 10. In addition, the PCB substrate 102 can include both insulating materials and conductive materials for isolating devices and providing electrical contact for active devices on the photonic die 108 as well as circuits/devices on the electronic die 118 via the interposer 110. In addition, the PCB substrate 102 can provide a thermally conductive path to dissipate the heat generated by devices and circuits in the electronic die 118 and the light source die 116.

In some embodiments, the electronic die 118 can include circuits having amplifiers, a control circuit, a digital processing circuit, etc. The electronic die 118 further includes electronic circuits (not shown) that provide the required electronic function of the device and driver circuits for controlling the light source or elements in the photonic die 108.

In some embodiments, the light source die 116 can include the components such as light emitting elements (e.g., a laser or a light emitting diode), transmission elements, modulation elements, signal processing elements, switching circuits, an amplifier, an input/output coupler, and light sensing/detection circuits. In some embodiments, each of the light-emitting elements in the light source die can include solid-state inorganic, organic or a combination of inorganic/organic hybrid semiconducting materials to generate light. In some other embodiments, the light source die 116 can be disposed on the photonic die 108.

In some embodiments, the photonic die 108 includes optical fibers 104, an optical interface, and a plurality of coupling gratings 114 that couple optical fibers 104 to the photonic die 108. In some embodiments, the coupling gratings 114 are configured to couple the light source (not shown) and the optical fibers 104. In some embodiments, the optical fibers 104 can be single-mode or multi-mode optical fibers. In some embodiments, the optical fibers 104 can be exposed on the photonic die 108.

In some embodiments, the photonic die 108 can include components such as a laser driver, a digital control circuit, photodetectors, waveguides, a calibration circuit, and light sources (i.e., laser). The coupling gratings 114 is configured to enable coupling of optical signals between the optical fibers 104 and the light source die 116 or corresponding photodetectors on the photonic die 108. In the current embodiment, the optical coupling device 10 has the grating structure including the coupling gratings 114 and waveguides with designs to reduce refractive index contract to reduce back reflection loss for providing improved coupling efficiency between the optical fibers 104. In some embodiments, the angle of the optical fibers 104 can be configured in a range of 5 degrees to 15 degrees according to the structure and material properties of the optical coupling device 10.

Figure 2:
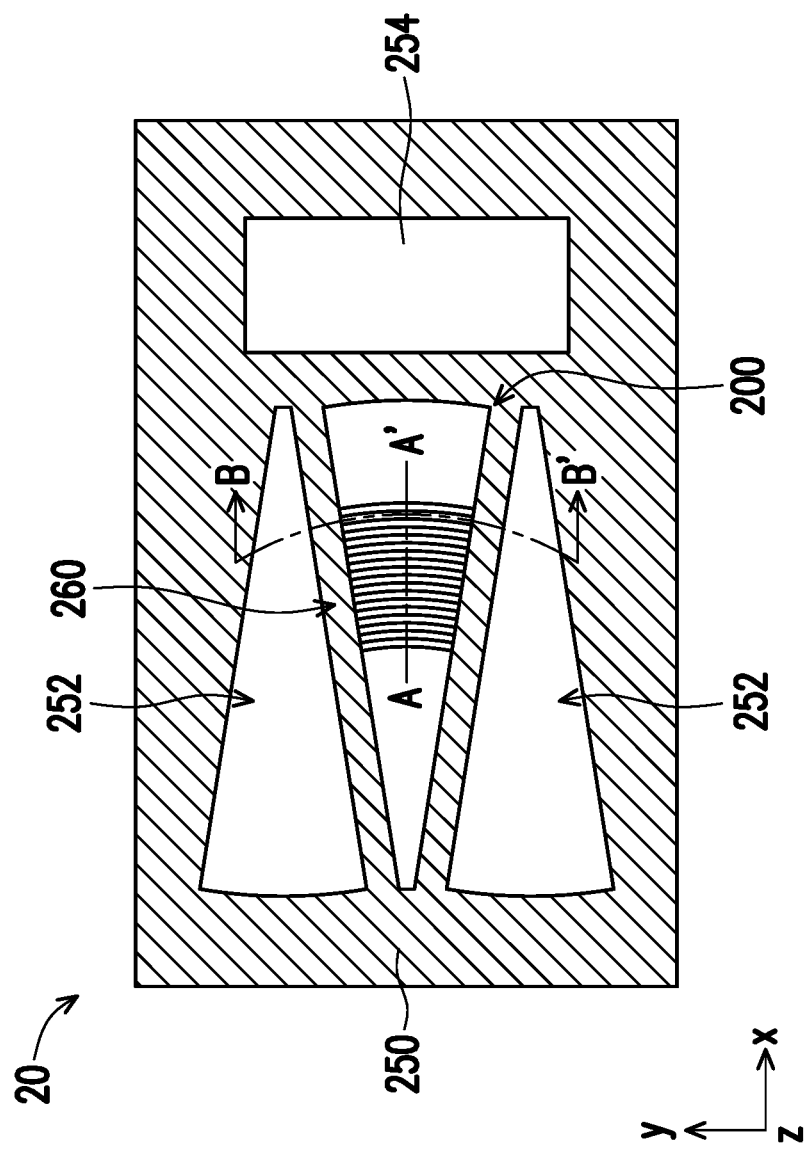
FIG. 2 is a schematic top view illustrating an optical coupler in accordance with some embodiments of the disclosure.
Figure 3:
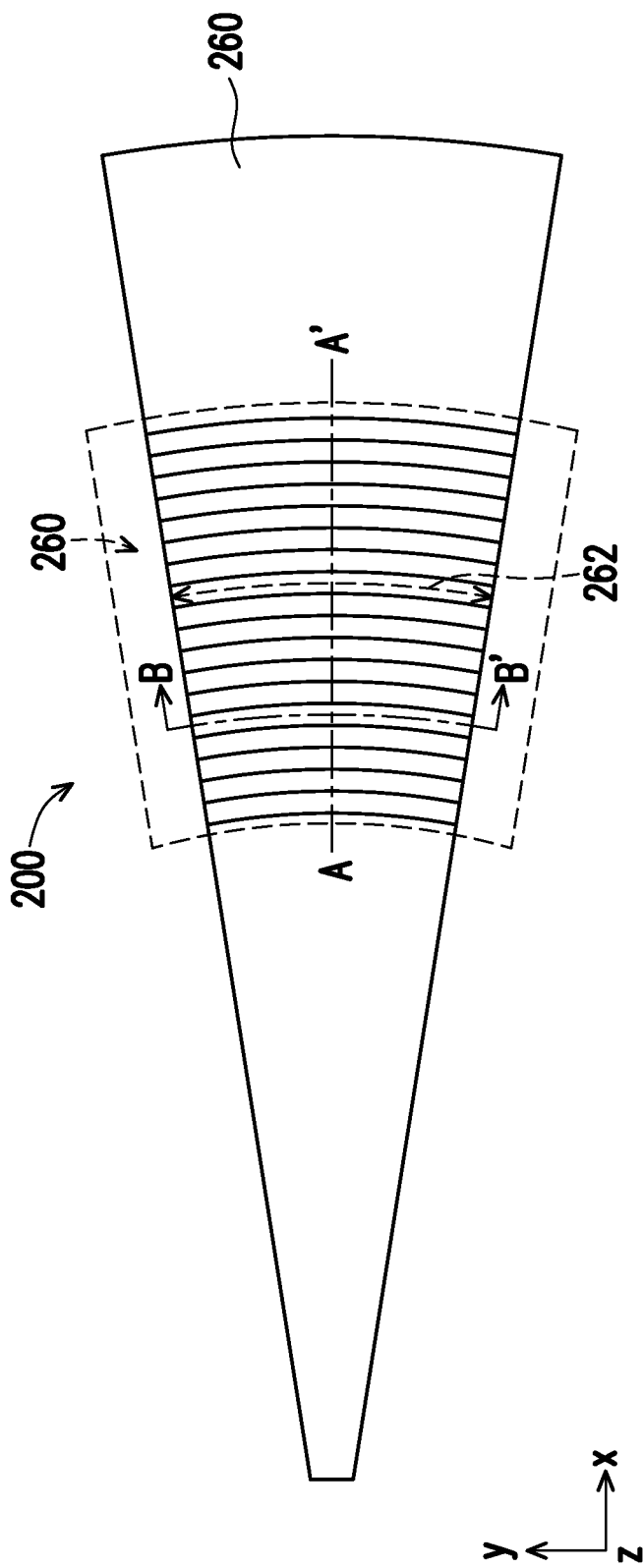
FIG. 3 is a schematic view illustrating a first heat dissipation plate of the semiconductor package 10 illustrated in FIG. 1 in accordance with some embodiments of the disclosure.
Figure 4:
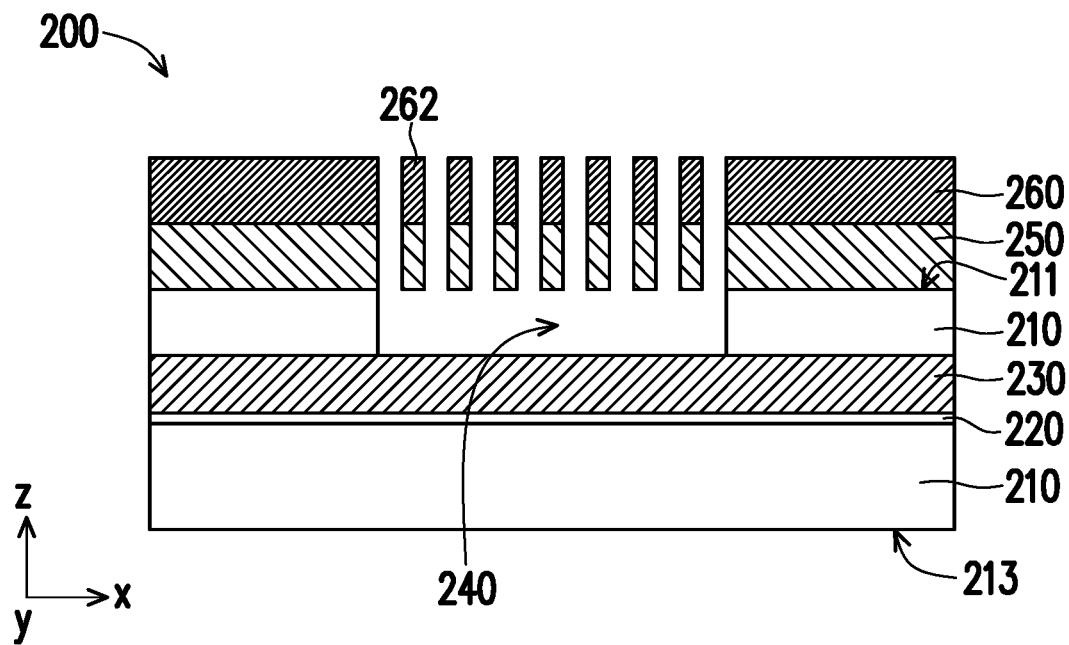
FIG. 4 is a schematic cross-sectional view along an AA' line of FIG. 3 illustrating a grating structure in accordance with some embodiments of the disclosure.
Figure 5:
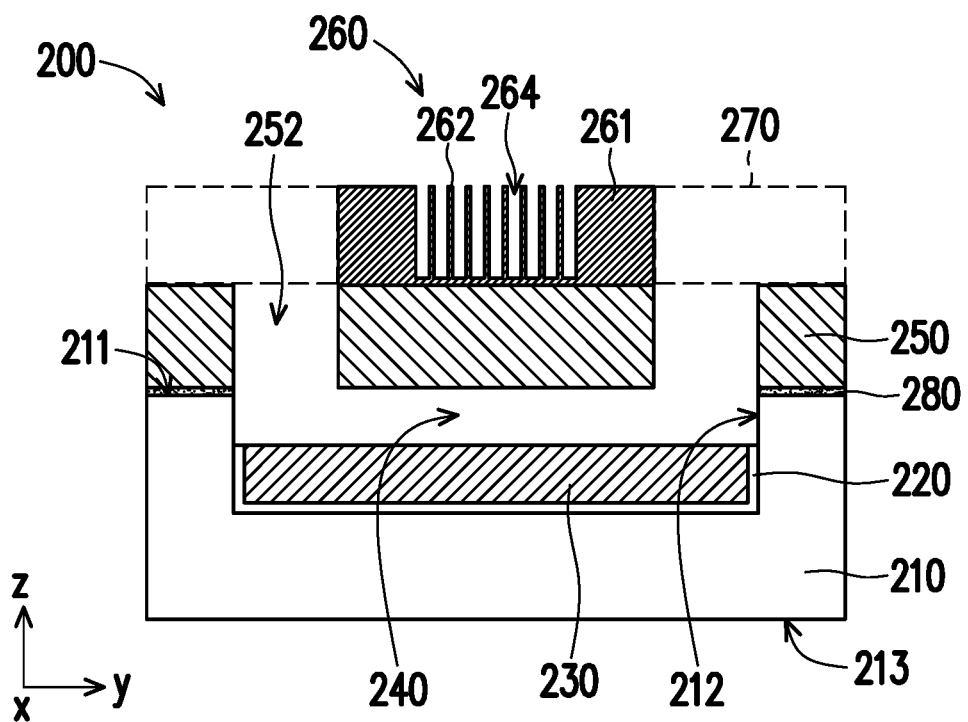
FIG. 5 is a schematic cross-sectional view along an BB' line of FIG. 3 illustrating the grating structure in accordance with some embodiments of the disclosure.

FIG. 2 is a schematic top view illustrating an optical coupler 20 in accordance with some embodiments of the disclosure. FIG. 3 is a schematic top view illustrating a grating structure 200 in accordance with some embodiments of the disclosure. FIG. 4 is a schematic cross-sectional view along an AA' line of FIG. 3 illustrating the grating structure 200 in accordance with some embodiments of the disclosure. FIG. 5 is a schematic cross-sectional view along an BB' line of FIG. 3 illustrating the grating structure 200 in accordance with some embodiments of the disclosure. Referring to FIG. 2 to FIG. 5, in some embodiments, the grating structure 200 of the optical coupler 20 includes a substrate 210, a mirror layer 230, an oxide layer 250, and a plurality of coupling gratings 262 and waveguides 261 formed in a silicon layer 260. Referring to FIG. 5, the substrate 210 includes a first surface 211, a second surface 213 opposite to the first surface 211, and a concave portion 212 exposed from the first surface 211. Moreover, the mirror layer 230 is disposed in the concave portion 212.

Referring to FIG. 4 and FIG. 5, the waveguides 261 and the coupling gratings 262 are disposed above the mirror layer 230 in the concave portion 212 and laterally aligned with each other. As illustrated in FIG. 5, the concave portion 212 faces the coupling gratings 262 and the waveguides 261. The oxide layer 250, which can be a dielectric layer, is bonded to the first surface 211 of the substrate 210, and the gratings 262 and the waveguides 261 are disposed on the oxide layer 250.

As shown in FIG. 4 and FIG. 5, in some embodiments, an air cavity 240 is disposed between the oxide layer 250 and the mirror layer 230. In addition, referring again to FIG. 2 and FIG. 5, in the optical coupler 20, the oxide layer 250 can further include a plurality of void regions 252, 254 penetrating therethrough and surrounding the grating structure 200. As shown in FIG. 5, the void regions 252 respectively connect to the air cavity 240 disposed underneath the coupling gratings 262 and the waveguides 261. As illustrated in FIG. 5, the mirror layer 230 is partially exposed from the void regions 252. In the current embodiment, light transmitted from the light source impinging the surroundings of the grating structure 200 can further reach the mirror layer 230 and reflected therefrom to arrive at the coupling gratings 262 and the waveguides 261. Accordingly, the back reflection loss in the optical coupler 20 can be reduced to provide enhanced coupling efficiency between the optical fibers on the corresponding waveguides. Accordingly, the optical coupler 20 from the current embodiment is adapted for silicon photonic input and output interface and adapted for high-speed optical signal transmitting applications.

In some embodiments, the substrate 210 is, for example, a silicon material substrate. In some embodiments, the mirror layer 230 can be formed by, for example, silicon nitride ($SiN_x$). In some other embodiments, the mirror layer 230 can be also formed by reflective metal materials such as aluminum (Al) or copper (Cu). In some embodiments, the oxide layer 250 can include, for example, silicon oxide. In the current embodiment, both the coupling gratings 262 and the waveguides 261 are formed by, for example, a silicon material. The total numbers of the coupling gratings 262 and the waveguides 261 are not limited to the number illustrated in exemplary embodiments of FIG. 4 and FIG. 5. The numbers of the coupling gratings 262 and the waveguides 261 can be adjusted based on the following manufacturing processes or practical applications.

Referring again to FIG. 4 and FIG. 5, in some embodiments, the coupling gratings 262 include a plurality of trenches 264 having a depth in a range substantially from 140 nanometers to 270 nanometers. In some embodiments, a thickness of the mirror layer 230 is in a range substantially greater than 200 nanometers. As shown in FIG. 5, in some embodiments, the grating structure 200 can further include an oxide liner layer 220 disposed between the mirror layer 230 and the substrate 210 to relieve the bonding strain and stress in the interface of the different materials such as silicon nitride ($SiO_2$) and Si due to lattice mismatch. Hence, the bonding strength between the mirror layer 230 and the substrate 210 can be further enhanced.

Figure 6A:
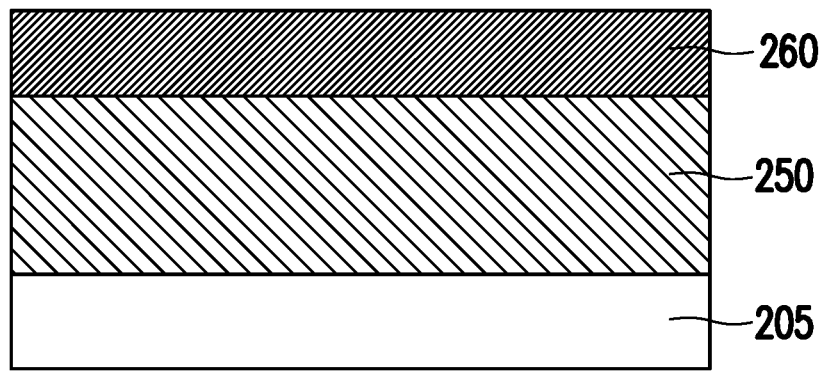
FIG. 6A to FIG. 6I are schematic view illustrating forming steps of waveguides and coupling gratings of a grating structure in accordance with some embodiments of the disclosure.

FIG. 6A to FIG. 6I are schematic view illustrating forming steps of waveguides 261 and coupling gratings 262 of a grating structure 200 in accordance with some embodiments of the disclosure. Referring to FIG. 6A, an insulating substrate such as a silicon on insulator (SOI) substrate, including a wafer layer 205, an oxide layer 250, and a silicon layer 260, is provided. In some embodiments, the wafer layer 205 is a silicon layer. In some other embodiments, the wafer layer 205 includes polycrystalline silicon. In some other embodiments, the wafer layer 205 can include the doped-polycrystalline silicon deposited using a chemical vapor deposition (CVD) process. In the current embodiment, the wafer layer 205 has a thickness in a range substantially from 50 micrometers to 1000 micrometers. Moreover, the wafer layer 205 includes, for example, a bulk silicon wafer.

In some embodiments, the oxide layer 250 is deposited on the wafer layer 205 by processes including, for example, thermal oxidation, spin coating, physical vapor deposition (PVD), and chemical vapor deposition, etc. In some other embodiments, the oxide layer 250 can be formed by a process such as wafer bonding or grinding. In some other embodiments, the oxide layer 250 can include aluminum oxide ($Al_2O_3$), hafnium oxide ($HfO_2$), lanthanum oxide ($La_2O_3$), zirconium oxide ($ZrO_3$), beryllium strontium titanium oxide (Ba—Sr—Ti—O), silicon nitride ($Si_3N_4$), and laminate of a mixture thereof, according to the applications. In some embodiments, the oxide layer 250 has a thickness in a range substantially from 500 nanometers to 2 micrometers.

Figure 6B:
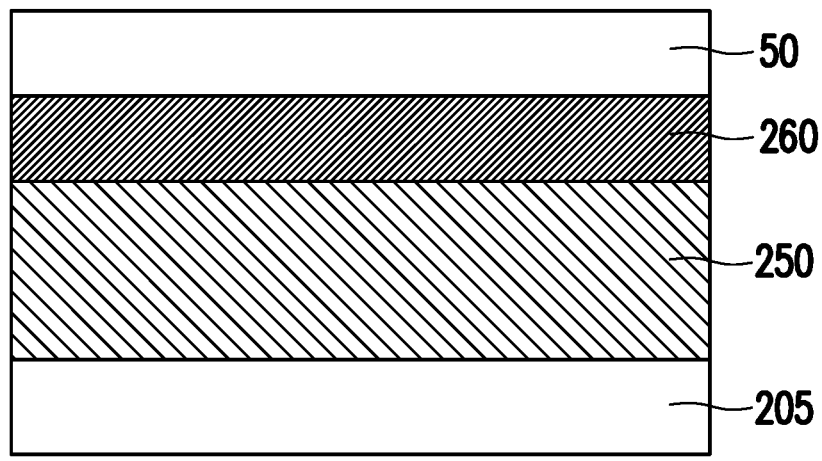

Referring to FIG. 6B, a first photoresist layer 50 is formed on the silicon layer 260. In some embodiments, the first photoresist layer 50 can include a negative or positive photoresist layer that is patternable in response to a photolithography light source. In some alternative embodiments, the first photoresist layer 50 can include an e-beam resist layer (e.g., example methyl methacrylate, poly methyl methacrylate, etc.) that is patternable in response to an e-beam lithography energy source. In some embodiments, the first photoresist layer 50 is formed over the silicon layer 260 by a deposition process such as spray-coating, spin-coating, dip-coating, roller-coating, etc. The first photoresist layer 50 is followingly patterned through a lithography process that can involve exposure, developing, baking, stripping, etching, and rinsing process. Accordingly, a plurality of openings is formed in the first photoresist layer 50 such that a portion of the top surface of the silicon layer 260 is exposed therefrom.

Figure 6C:
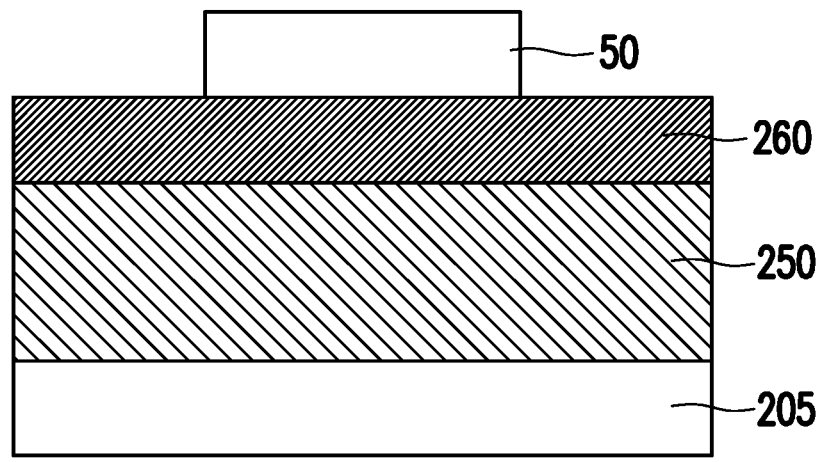
Figure 6D:
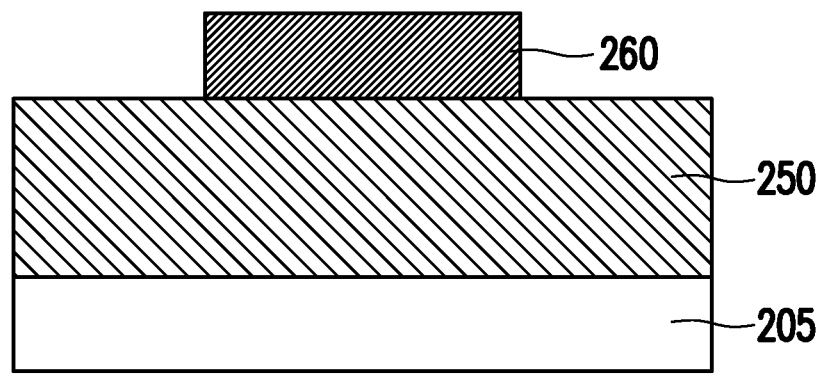

Referring to FIG. 6C, the portion of the top surface of the silicon layer 260 exposed from the openings of the first photoresist layer 50 is etched by using the patterned first photoresist layer 50 as a mask. Accordingly, the pattern of the first photoresist layer 50 can be transferred to the silicon layer 260 to form the waveguides 261 and coupling gratings 262. In some embodiments, the portion of the top surface of the silicon layer 260 is etched by a dry etching process, for example, a plasma enhanced deep reactive ion etching (DRIE) based on a proper chemistry according to the material property of the silicon layer 260. In some embodiments, after etching the silicon layer 260, the patterned first photoresist layer 50 can be removed by chemical processes involving 1-Methyl-2-pyrrolidon (NMP), acetone, Dimethyl sulfoxide (DMSO), or other suitable chemicals. In some embodiments, the chemicals applied to the patterned first photoresist layer 50 may be firstly heated to dissolve the patterned first photoresist layer 50. In some embodiments, the removing process of the first photoresist layer 50 can be followed by a rinse process involving isopropyl alcohol or the like with being further rinsed by deionized water. After patterning the silicon layer 260, a portion of the top surface of the oxide layer 250 is exposed from the silicon layer 260 for following manufacturing processes.

Figure 6E:
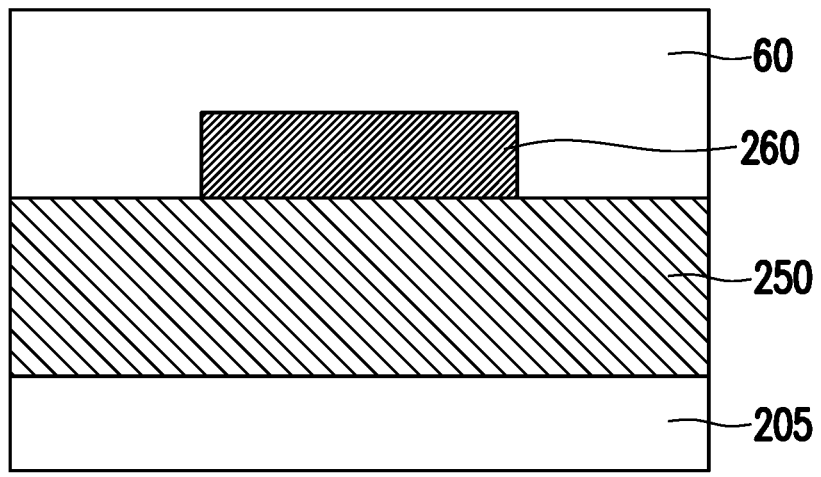

Referring to the forming step illustrated in FIG. 6E, a second photoresist layer 60 is deposited on the top surfaces of the patterned silicon layer 260 and the oxide layer 250. In some embodiments, the second photoresist layer 60 can also include a negative or positive photoresist layer that is patternable in response to a photolithography light source. In some alternative embodiments, the second photoresist layer 60 can include e-beam resist layer (e.g., example methyl methacrylate, poly methyl methacrylate, etc.) that is patternable in response to an e-beam lithography energy source. In addition, referring to FIG. 6F, the etching and patterning processes applied to the first photoresist layer 50 can be also applied to the second photoresist layer 60 to form a pattern 62 having a plurality of openings 64 that expose at least a portion of the top surface of the patterned silicon layer 260.

Figure 6F:
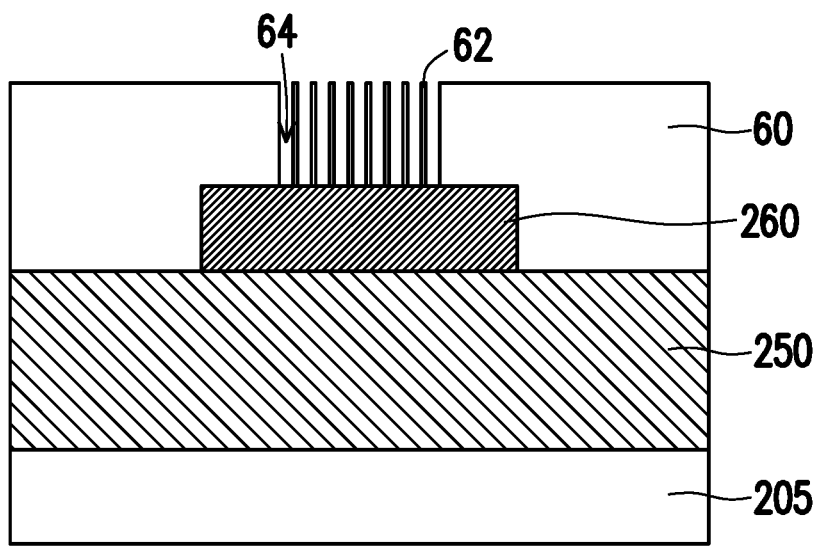
Figure 6G:
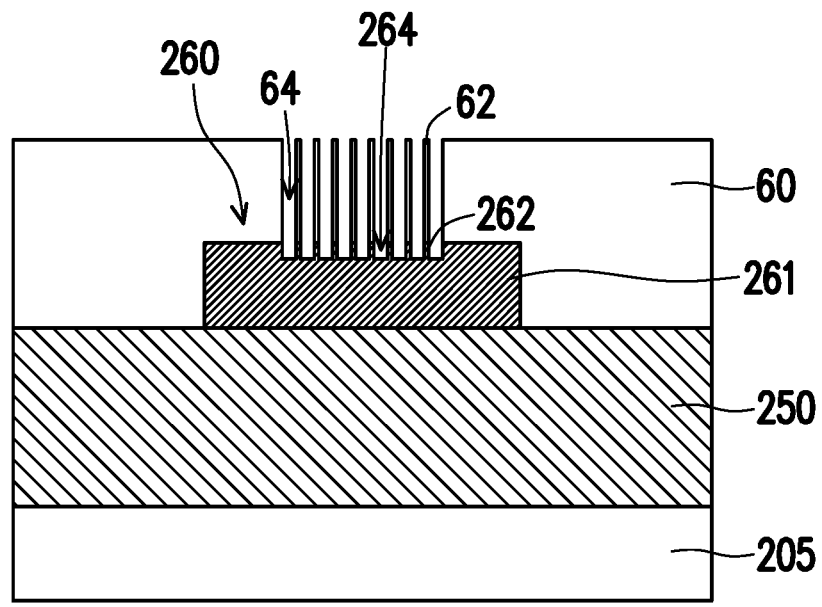

Referring to FIG. 6G, the top surface of the patterned silicon layer 260 exposed from the openings 64 can be etched by using the patterned second photoresist layer 60 as a mask to transfer the pattern 62 to the silicon layer 260. In some embodiments, the patterned silicon layer 260 can be etched by the dry etching process, for example, a plasma enhanced deep reactive ion etching (DRIE) based on a proper chemistry according to the material property of the silicon layer 260.

Figure 6H:
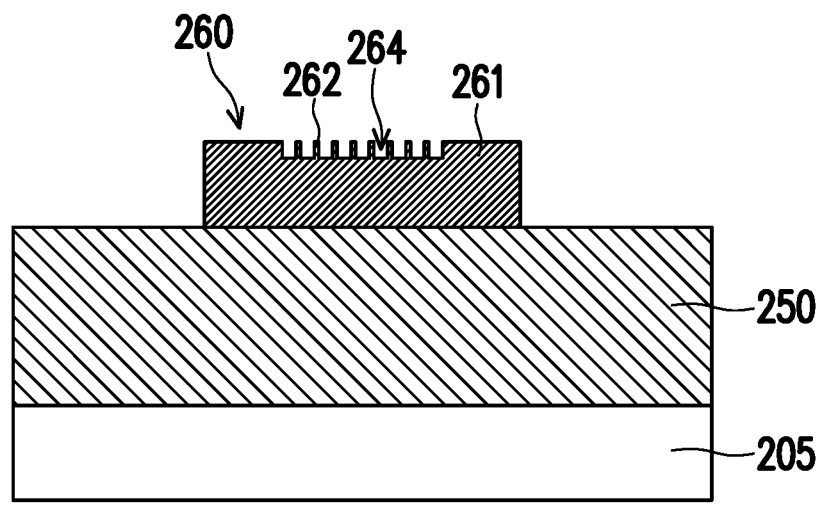

As shown in FIG. 6G, the patterned silicon layer 260 is etched to form a plurality of coupling gratings 262, shallow trenches 264, and waveguides 261. Referring to FIG. 6H, after the etchings process of the patterned silicon layer 260, the second photoresist layer 60 can be removed by chemical processes involving 1-Methyl-2-pyrrolidon (NMP), acetone, Dimethyl sulfoxide (DMSO), or other suitable chemicals. In some embodiments, the removing process of the second photoresist layer 60 can be followed by a rinse process involving isopropyl alcohol or the like with being further rinsed by deionized water. As shown in FIG. 6H, the shallow trenches 264 and the coupling gratings 262 are formed on the top surface of the silicon layer 260.

Figure 6I:
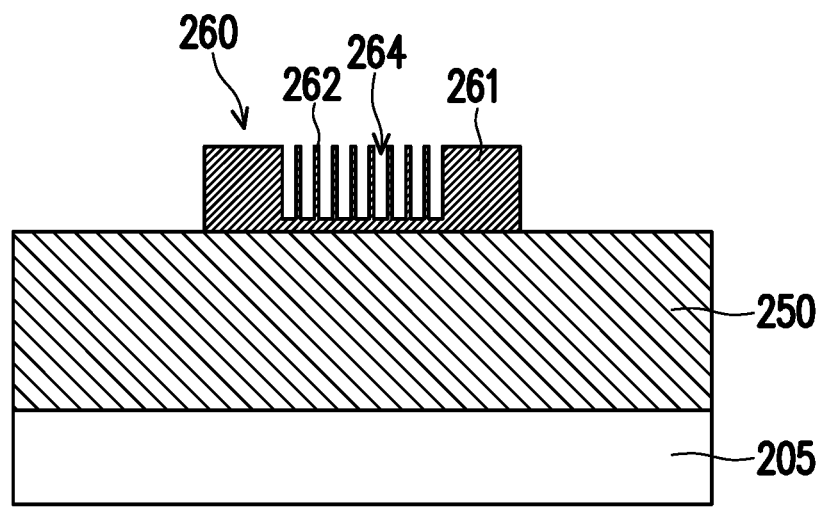

Referring to FIG. 6I, the patterning and etching processes shown in FIG. 6E to FIG. 6G can be repeatedly applied to the patterned silicon layer 260 to deeply etch the shallow trenches 264. The numbers of repetition of the patterning and etching processes shown in FIG. 6E to FIG. 6G can depend on the practical needs in the dimensions of the coupling gratings 262 and the waveguides 261 and desired optical properties of the grating structure 200. Moreover, the total number of the coupling gratings 262 is not limited to the exemplary embodiment illustrated in FIG. 6I, the number and distribution of the coupling gratings can be determined based desired materials, shapes, operational wavelengths, and applications of the coupling gratings 262.

Figure 7A:
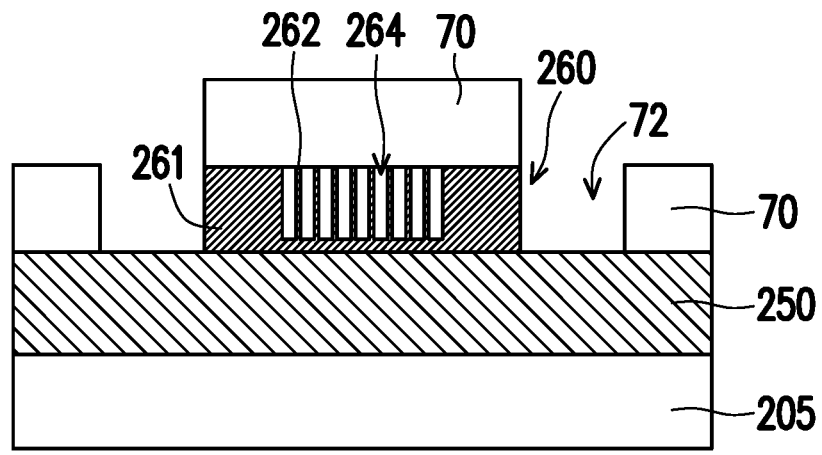
FIG. 7A to FIG. 7D are schematic view illustrating forming steps of void regions in an oxide layer of a grating structure in accordance with some embodiments of the disclosure.

FIG. 7A to FIG. 7D are schematic view illustrating forming steps of the void regions 252 in the oxide layer 250 of the grating structure 200 in accordance with some embodiments of the disclosure. FIG. 7A to FIG. 7D respectively illustrate the processes of forming the void regions 252 in the oxide layer 250. Referring to FIG. 7A, a third photoresist layer 70 is deposited and patterned on the top surfaces of the coupling gratings 262, the waveguides 261, and the oxide layer 250. As shown in FIG. 7A, the third photoresist layer 70 has a plurality of openings 72 vertically penetrating therethrough. In some embodiments, as shown in FIG. 7A, a portion of the top surface of the oxide layer 250 is exposed from the openings 72 of the third photoresist layer 70.

Figure 7B:
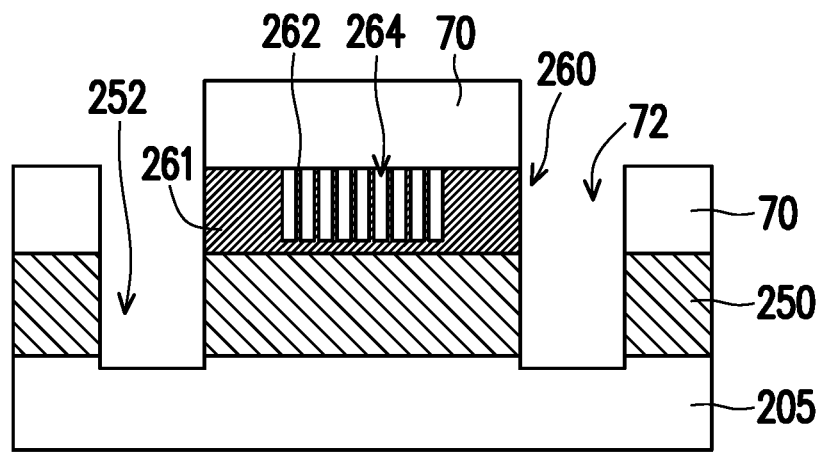

Referring to FIG. 7B, the surface of the oxide layer 250 can be etched by utilizing the third photoresist layer 70 as a mask. In some embodiments, the oxide layer 250 can be etched by the dry etching process, for example, a plasma enhanced deep reactive ion etching (DRIE) based on a proper chemistry according to the material of the oxide layer 250. As shown in FIG. 7B, the portions of the oxide layer 250 exposed from the openings 72 of the third photoresist layer 70 are further deeply etched to the surface of the wafer layer 205 to form a plurality of void regions 252 penetrating through the oxide layer 250. The void regions 252 respectively expose a portion of the top surface of the wafer layer 205.

Figure 7C:
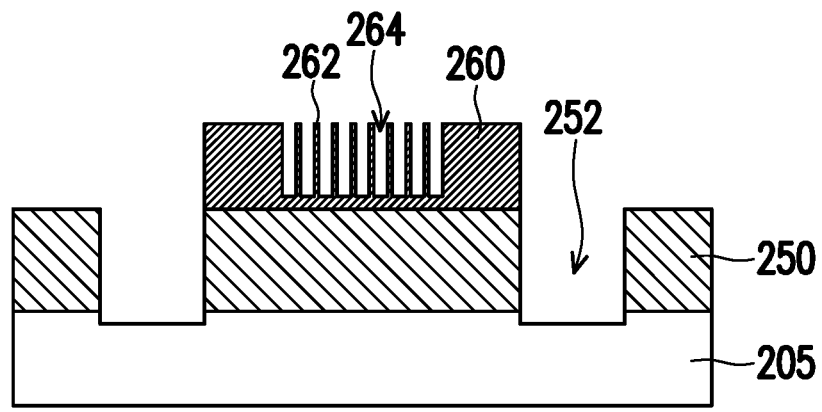

Referring to FIG. 7C, after the above manufacturing processes, the third photoresist layer 70 is removed by chemical processes involving 1-Methyl-2-pyrrolidon (NMP), acetone, Dimethyl sulfoxide (DMSO), or other suitable chemicals. In some embodiments, the removing process of the third photoresist layer 70 can be followed by a rinse process involving isopropyl alcohol or the like with being further rinsed by deionized water. As shown in FIG. 7C, the waveguides 261, the coupling gratings 262, the oxide layer 250, and the void regions 252 thereof are formed for following manufacturing processes. In the current embodiment, the total number of the void regions 252 are not limited to the exemplary embodiment shown in FIG. 7C. In some other embodiments, the number of the void regions 252 can be adjusted based on the practical needs of the application and the desired optical properties of the grating structure 200.

Figure 7D:
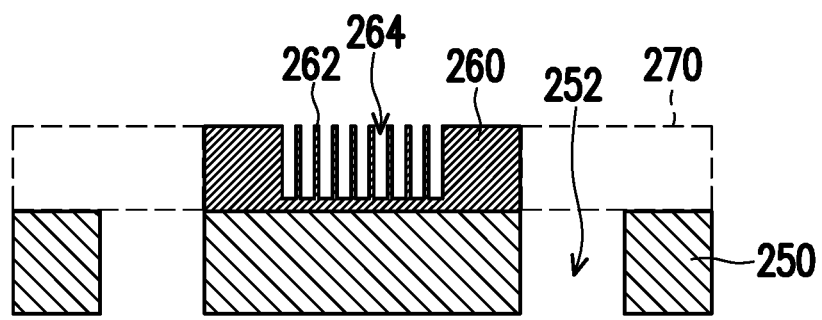

Referring to FIG. 7D, after removing the third photoresist layer 70, the wafer layer 205 can be removed by processes including grinding, polishing, and cleaning by, for example, a chemical mechanical planarization (CMP) process. As shown in FIG. 7D, after removing the wafer layer 205, the waveguide 261 and the coupling gratings 262 are still connected to the oxide layer 250 through the silicon layer 270, which is a part of the optical coupler 20 as shown in FIG. 2. To the manufacturing step shown in FIG. 7D, the coupling gratings 262, and waveguides 261, and the oxide layer 250 are separated from the wafer 205 and can be provided for the subsequent bonding process with the substrate 210 and the mirror layer 230.

Figure 8A:
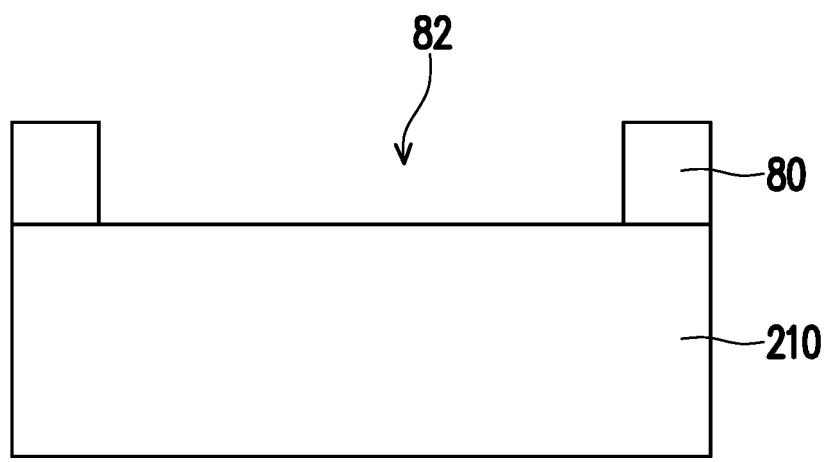
FIG. 8A to FIG. 8F are schematic view illustrating forming steps of a substrate and a mirror layer of a grating structure in accordance with some embodiments of the disclosure.

FIG. 8A to FIG. 8F are schematic view illustrating forming steps of the substrate 210 and the mirror layer 230 of a grating structure 200 in accordance with some embodiments of the disclosure. Referring to FIG. 8A, a substrate 210 is provided. In some embodiments, the substrate 210 is a silicon substrate. In some alternative embodiments, the substrate 210 can include other semiconductor materials such as germanium. In some embodiments, the substrate 210 can also include a compound semiconductor such as silicon carbide, gallium arsenic, indium arsenide, and indium phosphide. In some alternative embodiments, the substrate 210 can include an alloy semiconductor such as silicon germanium, silicon germanium carbide, gallium arsenic phosphide, and gallium indium phosphide.

In some embodiments, the substrate 210 is firstly cleaned by cleaning processes including, for example, cleaning the silicon wafer in a boiling ammoniated solution of hydrogen peroxide, etching the cleaned wafer in concentrated HF, oxidizing the etched wafer in a steam atmosphere at 1,100 degrees Celsius, recleaning and re-etching the oxidized wafer, heating the wafer for several minutes at 150 degrees Celsius, and oxidizing the wafer with water vapor at 600 degrees Celsius. As shown in FIG. 8A, subsequently, a third photoresist layer 80 is deposited and patterned on a top surface of the substrate 210.

In some embodiments, a fourth photoresist layer 80 is formed over the substrate 210 by a deposition process such as spray-coating, spin-coating, dip-coating, roller-coating, etc. The fourth photoresist layer 80 is followingly patterned in a lithography process that can involve exposure, developing, baking, stripping, etching, and rinsing processes. Accordingly, a concave opening 82 in the third photoresist layer 80 is formed such that a portion of the top surface of the substrate 210 is exposed from the concave opening 82 of the third photoresist layer 80.

Figure 8B:
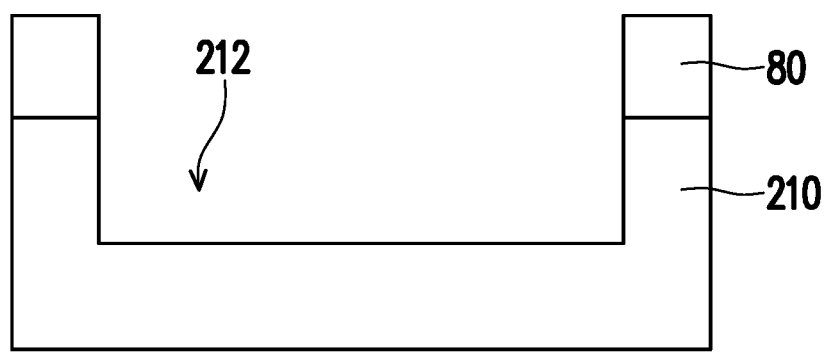

Referring to FIG. 8B, the substate 210 can be etched by using the fourth photoresist layer 80 as the mask. In some embodiments, the substrate 210 can be etched by the dry etching process, for example, a plasma enhanced deep reactive ion etching (DRIE) based on a proper chemistry according to the material of the silicon layer 210 or can be etched by the wet etching process. In some other embodiments, the substrate 210 can be etched by means of a wet chemical etching process, which can involve a sulfur and ammonia-based etching chemistry, along the concave opening 82. As shown in FIG. 8B, the portion of the substrate 210 exposed from the concave opening 82 of the third photoresist layer 80 is etched to form a concave portion 212 therein.

Figure 8C:
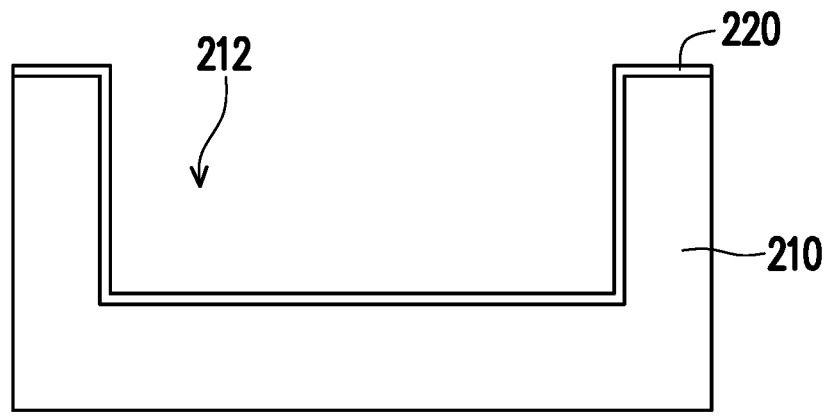
Figure 8D:
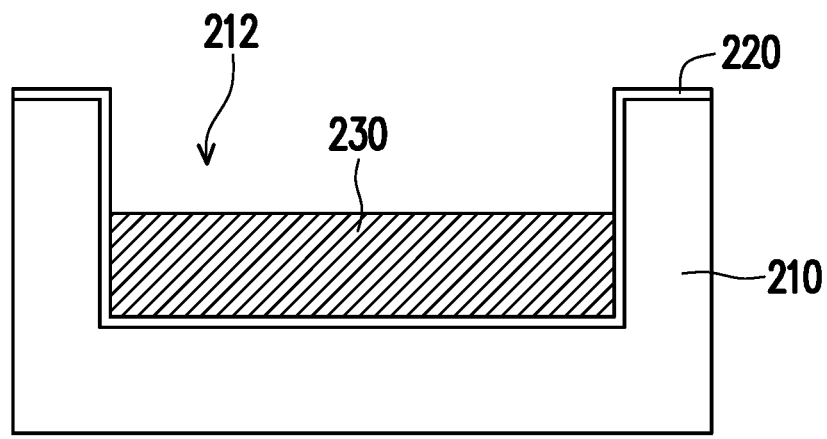

Referring to FIG. 8C, after forming the concave portion 212, the substrate 210, the fourth photoresist layer 80 is removed from the top surface of the substrate 210. The formed concave portion 212 is exposed from the top surface of the substrate 210. In some embodiments, a depth of the concave portion 212 can be in a range substantially from 300 nanometers to 10 micrometers. As shown in FIG. 8C, in some embodiments, the oxide liner layer 220 is further disposed on the surface of the concave portion 212 and the top surface of the substrate 210. In some embodiments, the oxide liner layer 220 can include silicon oxide or other oxide-rich liner materials, for example, silicon oxynitride (SiON) and silicon nitride (SiN).

Figure 8E:
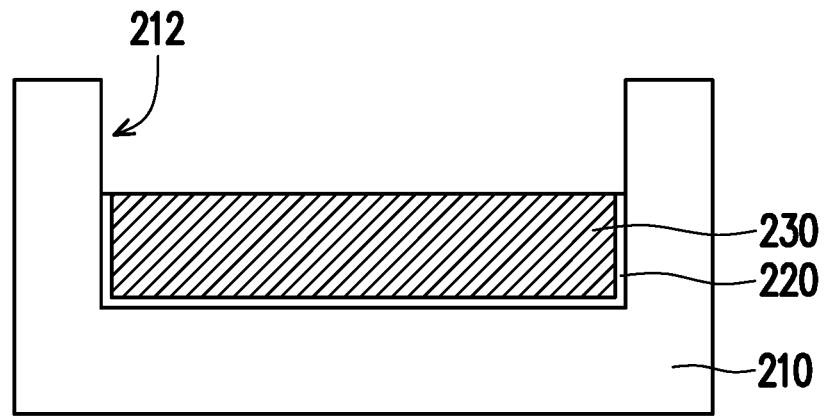

Referring to FIG. 8E, the mirror layer 230 is disposed in the concave portion 212, and the oxide liner layer 220 is disposed between the substrate 210 and the mirror layer 230. In some embodiments, the mirror layer 230 includes, for example, silicon nitride ($SiN_x$). In the current embodiment, the oxide liner layer 220 can relieve bonding stress and strain generated between the substrate 210 and the mirror layer 230 incurred during the bonding process. Accordingly, the bonding strength between the mirror layer 230 and the substrate 210 can be further enhanced without resulting in peeling of the mirror layer 230. In the current embodiment, due to utilizing $SiN_x$ as the material for forming the mirror layer 230, the optical properties and coupling efficiency of the coupling gratings 262, and the mirror layer 230 can be suitable for any grating coupler. In addition, $SiN_x$ can be easily processed without needs of high temperature fabrication processes commonly utilized for metal materials, which can have benefits in reducing the overall processing time and the cost of fabrication.

In some alternative embodiments, the mirror layer 230 may include reflective metal materials such as Al or Cu.

Figure 8F:
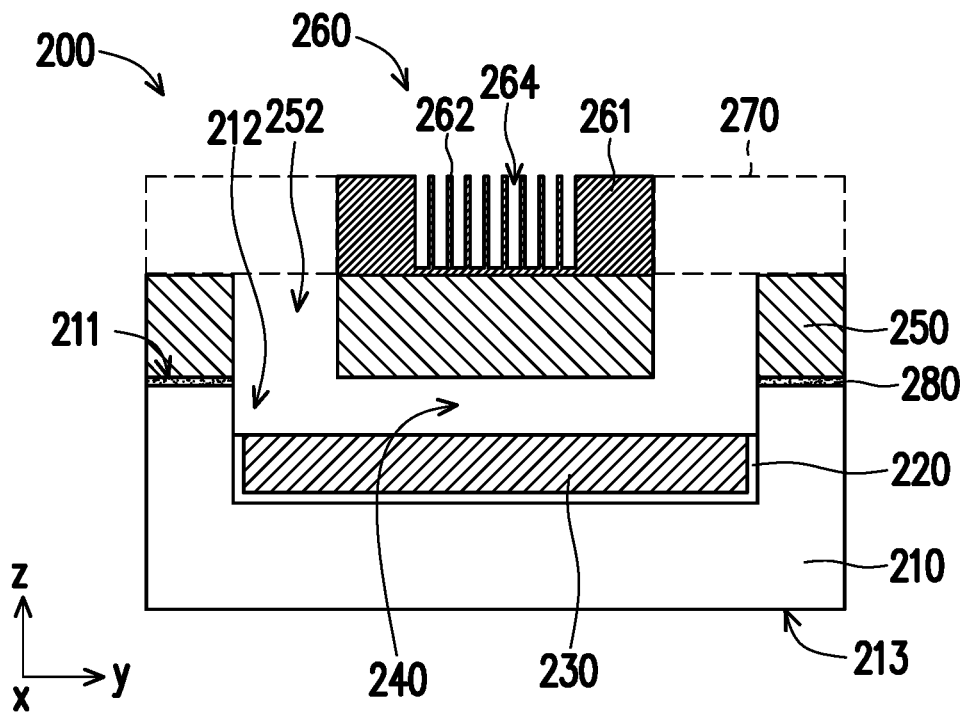

Referring to FIG. 8F, the coupling gratings 262, the wave guide 261, and the oxide layer 250 as shown in FIG. 7D can be bonded to the substrate 210 through a bonding layer 280. In some embodiments, the bonding layer 280 can include a fusion bonding material combining an oxide material (e.g., $SiO_2$) and a semiconductor material (e.g., Si). In some embodiments, the process of forming bonding layer 280 can include surface cleaning and activation by cleaning or etching. In some embodiments, the fusion bonding material of the bonding layer 280 can be processed in a room temperature to provide activated surfaces on the oxide layer 250 and the substrate 210 for achieving high bonding strength therebetween for subsequent manufacturing processes and/or desired applications. After the oxide layer 250 being bonded to the substrate 210, the air cavity 240 is formed between the oxide layer 250 and the mirror layer 230. To the stage shown in FIG. 8F, the entire manufacturing process of the grating structure 200 is completed.

In some embodiments, a cladding layer (not illustrated) formed by, for example, silicon oxide can be further formed on the waveguides 261 and the coupling gratings 262.

Figure 9:
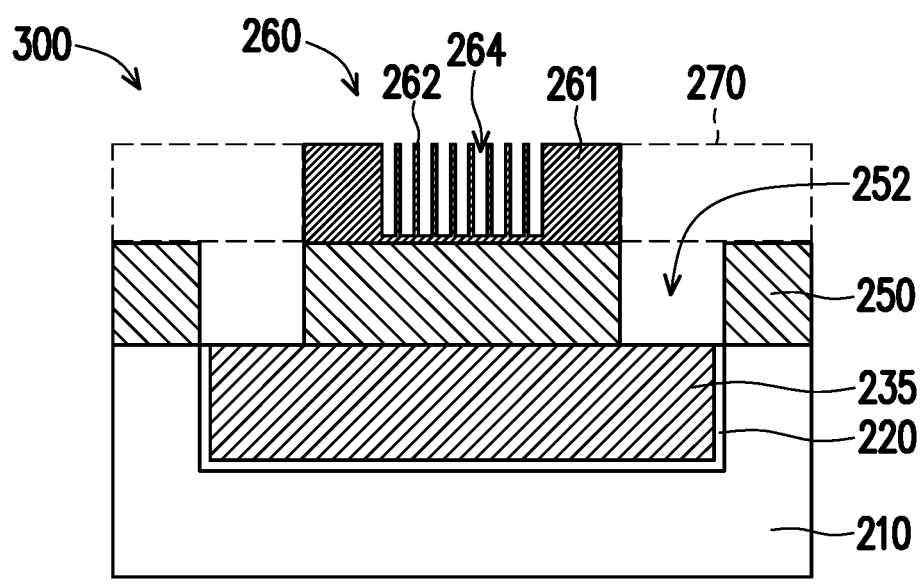
FIG. 9 is a schematic view illustrating the grating structure in accordance with some embodiments of the disclosure.

FIG. 9 is a schematic view illustrating a grating structure 300 in accordance with some embodiments of the disclosure. In some embodiments, the grating structure 300 can include a mirror layer 235 that is filled in the entire concave portion 212 of the substrate 210. Namely, in the current embodiment, there is no air cavity to be formed between the oxide layer 250 and the mirror layer 230 as the previous embodiment. In some other embodiments, the filling level of the mirror layer 230 in the concave portion 212 can depend on the needs the practical applications and desired optical properties of the optical coupler 20.

In accordance with some embodiments, an optical coupler includes a substrate, a mirror layer, a plurality of coupling gratings, a plurality of waveguides, and an oxide layer. The substrate includes a first surface, a second surface opposite to the first surface, and a concave portion exposed from the first surface. The mirror layer is disposed in the concave portion. The coupling gratings are disposed above the mirror layer. The waveguides are laterally aligned with the coupling gratings. The concave portion faces the coupling gratings and the waveguides. The oxide layer is bonded to the first surface. The coupling gratings and the waveguides are disposed on the oxide layer.

In accordance with some embodiments, a grating structure includes a substrate, a mirror layer, a plurality of coupling gratings, a plurality of waveguides, and an air cavity. The substrate includes a first surface, a second surface opposite to the first surface, and a concave portion exposed from the second surface. The mirror layer is disposed in the concave portion. The coupling gratings is disposed above the mirror layer. The waveguides are laterally aligned with the coupling gratings. The concave portion faces the coupling gratings and the waveguides. The air cavity is disposed between the coupling gratings and the mirror layer.

In accordance with some embodiments, a method for forming an optical coupler includes forming an insulting substrate. Moreover, a plurality of coupling gratings and waveguides are formed on the insulating substrate. The coupling gratings and the waveguides are aligned with each other. A silicon substrate having a first surface and a second surface opposite to the first surface. The concave portion is formed in the silicon substrate and exposed from the first surface. The mirror layer is formed in the concave portion. The plurality of coupling gratings and waveguides are bonded to the silicon substrate. The air cavity is formed between the coupling gratings and the mirror layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical coupler, comprising:
   a substrate, comprising a first surface, a second surface opposite to the first surface, and a concave portion exposed from the first surface;
   a mirror layer, disposed in the concave portion;
   a plurality of coupling gratings, disposed above the mirror layer;
   a plurality of waveguides, laterally aligned with the plurality of coupling gratings, wherein the concave portion faces the plurality of coupling gratings and the waveguides; and
   an oxide layer, bonded to the first surface, wherein the coupling gratings and waveguides are disposed on the oxide layer.

2. The optical coupler as claimed in claim 1, further comprising an air cavity disposed between the plurality of coupling gratings and the mirror layer.

3. The optical coupler as claimed in claim 2, wherein the oxide layer comprises void regions penetrating therethrough and respectively connected with the air cavity.

4. The optical coupler as claimed in claim 1, wherein the mirror layer comprises silicon nitride.

5. The optical coupler as claimed in claim 1, wherein a thickness of the mirror layer is greater than 200 nanometers.

6. The optical coupler as claimed in claim 1, further comprising an oxide liner layer disposed between the substrate and the mirror layer in the concave portion.

7. The optical coupler as claimed in claim 1, wherein a depth of the concave portion is in a range from 100 nanometers to 10 micrometers.

8. The optical coupler as claimed in claim 1, further comprising a bonding layer between the oxide layer and the substrate, wherein the bonding layer comprises silicon oxide and silicon.

9. A grating structure, comprising:
   a substrate, comprising a first surface, a second surface opposite to the first surface, and a concave portion exposed from the first surface;
   a mirror layer, disposed in the concave portion;
   a plurality of coupling gratings, disposed above the mirror layer, wherein an air cavity is disposed between the plurality of coupling gratings and the mirror layer; and
   a plurality of waveguides, laterally aligned with the coupling gratings, wherein the concave portion faces the plurality of coupling gratings and waveguides.

10. The grating structure as claimed in claim 9, further comprising a dielectric layer is bonded on the substrate, wherein the plurality of coupling gratings and the waveguides are disposed on the dielectric layer.

11. The grating structure as claimed in claim 10, wherein the dielectric layer comprises silicon oxide.

12. The grating structure as claimed in claim 11, wherein a plurality of void regions penetrates the dielectric layer and surrounds the coupling gratings, wherein the plurality of void portions is connected to the air cavity.

13. The grating structure as claimed in claim 10, wherein a bonding layer is formed between the dielectric layer and the substrate.

14. The grating structure as claimed in claim 9, wherein the mirror layer comprises silicon nitride.

15. The grating structure as claimed in claim 9, wherein an oxide liner layer is disposed between the substrate and the mirror layer in the concave portion, wherein the oxide liner layer comprises silicon oxide and silicon.

16. A method for forming an optical coupler, comprising:
   forming an insulating substrate;
   forming a plurality of coupling gratings and waveguides on the insulating substrate, wherein the plurality of coupling gratings and waveguides are laterally aligned with each other;
   forming a silicon substate having a first surface and a second surface opposite to the first surface, wherein a concave portion is formed in the silicon substrate and exposed from the first surface;

forming a mirror layer in the concave portion; and bonding the plurality of coupling gratings and waveguides to the silicon substrate, wherein an air cavity is formed between the plurality of coupling gratings and the mirror layer.

17. The method as claimed in claim 16, wherein the insulating substrate comprises a wafer layer and an oxide layer disposed thereon, wherein the plurality of coupling gratings and waveguides are formed on the oxide layer, and the wafer layer is removed after forming the plurality of coupling gratings and waveguides.

18. The method as claimed in claim 17, wherein the wafer layer comprises a bulk silicon wafer.

19. The method as claimed in claim 17, further comprising depositing an oxide liner layer between the mirror layer and the silicone substrate, wherein the oxide liner layer comprises silicon oxide.

20. The method as claimed in claim 16, further comprising forming void regions penetrating through the oxide layer, wherein the void regions are respectively connected to the air cavity.

\* \* \* \* \*